Nov. 15, 1927.

A. F. GIRARDIN 1,649,682

ACETYLENE GENERATOR

Filed Dec. 5, 1925

Inventor
Auguste Francois Girardin
By B. Singer, Atty.

Patented Nov. 15, 1927.

1,649,682

UNITED STATES PATENT OFFICE.

AUGUSTE FRANÇOIS GIRARDIN, OF DAMPIERRE, FRANCE.

ACETYLENE GENERATOR.

Application filed December 5, 1925, Serial No. 73,413, and in France December 11, 1924.

This invention relates to improvements in acetylene generators, and its object is to devise apparatus highly efficient with regard to its manner of working as well as with regard to its structure.

In the acetylene generator according to the invention, the production of gas takes place owing to a contact between water and the calcium carbide automatically in accordance with the demand, by variations of the pressure acting on a water column with two levels, a movable bell operating as a regulating float controlling the production of the developed gas.

With the generator as outlined above, is coupled a bell, the displacements whereof together with an inner valve installed over the admission pipe for the entry of gas into the bell, keeps the level in the generator constant and ensures constant regular pressure.

A device interposed between the generator and the bell avoids the necessity of storing gas in the generator and hence the apparatus is limited to function for the production of gas.

Figure 1:
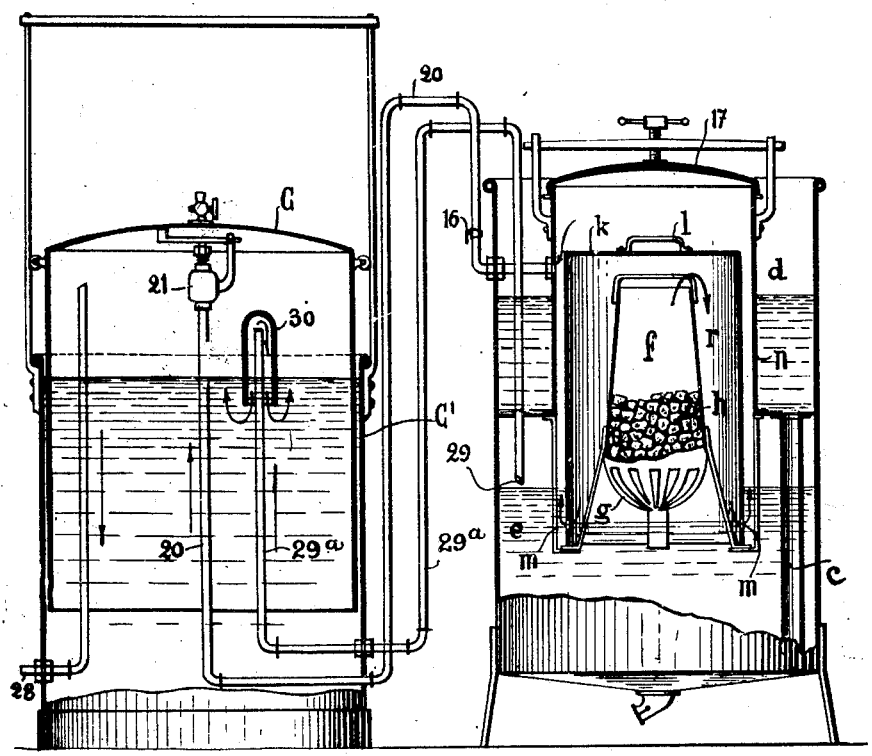

A preferred form of the invention is presented in the accompanying drawings, in which Figure 1 is a sectional view of the entire apparatus including the generator and the storing and dispensing bell or reservoir.

Figure 2:
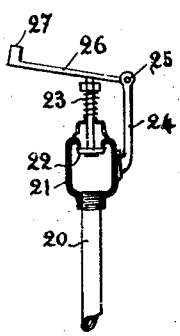

Figure 2 is a detail sectional view of the gas regulating valve.

The generator comprises a vessel with two compartments $d$ and $e$, the one above the other, and a fixed bell $n$ with a cover 17 and a gas outlet at 16. In the interior of the fixed bell $n$ is supported a fixed basket $f$ for the calcium carbide $h$ resting on the perforated bottom $g$ of the basket. The basket $f$ is covered by a movable bell $k$ having a handle $l$ and which is arranged in the fixed bell $n$. This shell is provided with apertures $m$ in its lower part. The water contained in the upper reservoir $d$ flows through the tube $c$ into the lower reservoir $e$. The water level rises in the said lower reservoir $e$ and reaches the calcium carbide contained in the basket $f$. The movable bell $k$ then raises, its gas capacity increasing as it rises from the water.

The excess of gas flows through the orifices $m$ and rises through water in the compartment $e$ into the fixed bell $n$, and hence is cooled and washed.

In proportion as the water rises in the shell $k$, it attacks the calcium carbide and detaches spent particles, which fall to the bottom of the water reservoir $e$ and hence the calcium carbide is always exposed to action. In case of a sudden demand of gas the same will be generated in great quantity. On closing the cock 16 in the gas pipe 20, the excess of pressure produced at $r$ acts on the water level in the chamber $e$ and ensures the forcing of the liquid into the upper part $d$ through the pipe $c$. The generation of the gas ceases when the water is forced away from the carbide by the pressure of the gas above.

If, on the contrary, the apparatus empties itself of its generated gas, the atmospheric pressure acts at $d$, water flows into $e$, the level of attack is reestablished and the movable bell $k$ is raised as the gas is produced and is available for consumption.

The generator is connected with the bell C through the medium of the pipe 20 which leads from the fixed bell $n$ of the generator into and upwardly in the tank or vessel C'. The upper extremity of this pipe carries a body 21 in which is a valve 22 (Fig. 2) acted upon by a spring 23 for closing. A support 24 carries an articulation 25 of a lever 26, an upwardly bent extremity 27 of the latter abutting against the top of the bell C when the latter is lowered and hence opening the said valve 22. A service pipe 28 leads from the bell C.

For purposes of consumption, the gas contained in the part $e$ of the generator passes into the bell C and, owing to the pressure exerted by the water column at $d$, the level raises at $e$ up to the moment when it attains the basket $f$ containing the calcium carbide. The latter thus coming into contact with water, gas is generated and stored in the bell $k$ which raises until gas therein escapes through the apertures $m$, gas as hereinbefore stated being forced thereby.

When the volume of gas stored surpasses the demands of consumption, the water level is lowered at $e$ and raised at $d$, and the orifice 29 at the lower inner end of pipe 29$^a$ is uncovered, permitting the access of gas to the bell C after passing through the washer 30.

The gas stored in the bell C raises the same and the valve 22 is closed by the spring 23 and cuts off the admission of gas through the pipe 20 into the bell C.

The bell C with its valve preserves a constant level of water in the generator and ensures regular pressure for service purposes.

What I claim is:—

Acetylene gas generating apparatus comprising a generator including a pair of water vessels arranged one at a higher elevation than the other and having a water connecting pipe extending from the bottom of the higher vessel to a point near the bottom of the lower vessel and also including a fixed bell in the upper vessel and a fixed calcium carbide holder arranged within said fixed bell and extending downwardly into the lower vessel and a movable gas bell in said fixed bell and within which said fixed holder is also arranged, and a gas storage element including a movable gas bell, a gas pipe leading from a point above the normal water level in the said lower water vessel to said last named bell and a second gas pipe leading from the fixed bell of the higher water vessel also to the last named bell, the last named pipe being provided at its gas discharge end with a valve arranged to be controlled by the last named gas bell, and the service pipe leading from the last named gas bell.

In witness whereof I affix my signature.

A. F. GIRARDIN.